(12) United States Patent
Kim (10) Patent No.: US 10,436,279 B2
(45) Date of Patent: Oct. 8, 2019

(54) TORQUE ROD

(71) Applicants: Hyundai Motor Company, Seoul (KR); Kia Motors Corporation, Seoul (KR)

(72) Inventor: Seung-Won Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/709,214

(22) Filed: Sep. 19, 2017

(65) Prior Publication Data

US 2018/0347660 A1    Dec. 6, 2018

(30) Foreign Application Priority Data

Jun. 2, 2017  (KR) .................. 10-2017-0069262

(51) Int. Cl.
| | | |
|---|---|---|
| *F16F 13/08* | (2006.01) | |
| *B60K 5/12* | (2006.01) | |
| *B60K 17/00* | (2006.01) | |
| *F16F 1/38* | (2006.01) | |

(52) U.S. Cl.
CPC ............ *F16F 13/08* (2013.01); *B60K 5/1241* (2013.01); *B60K 5/1208* (2013.01); *B60K 17/00* (2013.01); *F16F 1/3849* (2013.01)

(58) Field of Classification Search
CPC ...... F16F 13/08; F16F 1/3849; B60K 5/1216; B60K 5/1241; B60K 17/00; B60K 5/1208; B60Y 2304/05; B60Y 2400/48; B60Y 2304/03

USPC ..... 267/140.11, 140.13, 141.1, 141.4, 64.11, 267/64.13, 293, 294; 188/379, 380; 248/636, 638; 280/124.109; 180/312
See application file for complete search history.

(56) References Cited

U.S. PATENT DOCUMENTS

| | | | | |
|---|---|---|---|---|
| 3,552,785 | A | * | 1/1971 | Elder et al. ............. B60G 3/20 267/67 |
| 5,088,704 | A | * | 2/1992 | Kanda .................. B60G 13/003 267/140.13 |
| 8,839,900 | B2 | * | 9/2014 | Kim .................... F16F 13/1463 180/312 |
| 2015/0204406 | A1 | * | 7/2015 | Yoon ...................... F16F 6/005 248/562 |
| 2016/0221430 | A1 | * | 8/2016 | Kim ........................ F16F 1/371 |
| 2018/0105028 | A1 | * | 4/2018 | Kim ..................... B60K 5/1216 |

FOREIGN PATENT DOCUMENTS

| KR | 20070060401 A | * | 6/2007 |
|---|---|---|---|
| KR | 1020090124214 B1 | * | 6/2011 |
| KR | 101262007 B1 | * | 5/2013 |
| KR | 1020090052051 A | * | 10/2013 |

* cited by examiner

*Primary Examiner* — Pamela Rodriguez
(74) *Attorney, Agent, or Firm* — Morgan, Lewis & Bockius LLP (57) ABSTRACT

A torque rod, in which a front rubber and a rear rubber are respectively disposed at front and rear sides of a partition of a case fixed to a sub-frame and in which a pipe portion of a rod connected at a front end portion thereof to a power train passes through the front rubber, the partition, and the rear rubber and is coupled to an end plate, may include an attenuation device configured to cause flow of a liquid therein according to a load or vibration transferred from the rod, wherein the attenuation device is separably mounted between the rod and the end plate.

8 Claims, 6 Drawing Sheets

FIG. 6 ic
TORQUE ROD

CROSS-REFERENCE TO RELATED APPLICATION

The present application claims priority to Korean Patent Application No. 10-2017-0069262, filed on Jun. 2, 2017, the entire contents of which is incorporated herein for all purposes by the present reference.

BACKGROUND OF THE INVENTION

Field of the Invention

The present invention relates to a vehicle torque rod, which is mounted on a sub-frame and is connected at the front end portion thereof to a power train to support the behavior of the power train, and to a torque rod on which an additional attenuation device is mounted to increase vibration attenuation performance, the attenuation device being attachable/detachable to facilitate replacement and repair thereof and being additionally installable even to a conventional torque rod.

Description of Related Art

In a vehicle fabricated of a monocoque body, a vehicle body itself functions as a frame and suspension and chassis parts are mounted thereto. However, to prevent vibrations of a power train from being directly transferred to the vehicle body and to disperse shocks in the event of a vehicle collision, a sub-frame is mounted to the bottom portion of the vehicle.

For example, a suspension device and a steering device are mounted on the sub-frame, and the sub-frame is connected to the bottom portion of the power train via a torque rod. That is, the torque rod mounted on the sub-frame is a device that shares the displacement control and vibration attenuation of the power train with an engine mount and a transmission mount.

Figure 1:
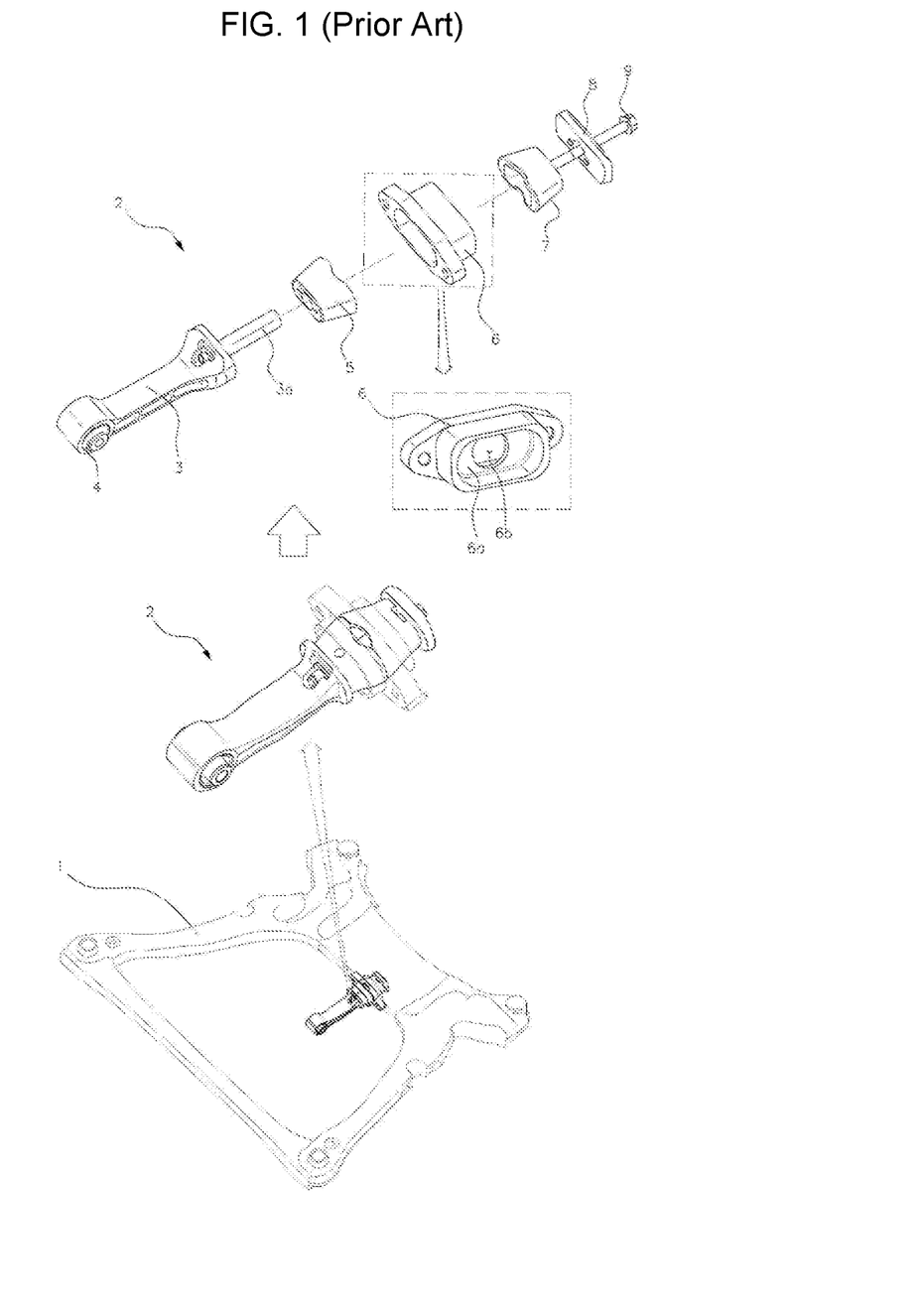
FIG. 1 is a view illustrating the assembled state and the exploded state of a conventional torque rod and a sub-frame.

Meanwhile, as illustrated in FIG. 1, a conventional torque rod 2 includes a rod 3, which is connected at the front end portion thereof to the power train and has a bar shape, and an end plate 8, which is coupled to the rear end portion of an expanded pipe portion 3a provided on the rear side of the rod 3. A case 6 is mounted between the rod 3 and the end plate 8 to be coupled to a sub-frame 1. The case 6 has a partition 6a formed therein to come into contact with each of a front rubber 5 and a rear rubber 7. The partition 6a is provided with a hole 6b through which the pipe portion 3a passes.

The front rubber 5 and the rear rubber 7, which are formed of a rubber material (or a synthetic resin material), are disposed respectively at the front side and the rear side of the case 6. In addition, a rubber bushing 4 is mounted on the front end portion of the rod 3 to be connected to the power train. When the end plate 8 is fitted on the pipe portion 3a that has passed through the front rubber 5, the case 6 and the rear rubber 7, a bolt 9 is inserted into and fixed inside the pipe portion 3a to complete the coupling of the front rubber 5, the case 6, the rear rubber 7, and the end plate 8.

The front rubber 5 and the rear rubber 7 control the behavior of the power train when the vehicle moves forward or backward, and are elastically deformable for vibration attenuation. The rod moves forward or backward due to the behavior of the power train caused by inertia upon rapid acceleration or sudden deceleration of the vehicle. At this time, the front rubber 5 and the rear rubber 7 are supported by the partition 6a of the case 6 to be elastically compressed.

Meanwhile, in the engine mount or the transmission mount, vibration attenuation using the flow of liquid (as in a hydraulic-mount) is more widely adopted than vibration attenuation using the elastic deformation of materials (as in a rubber mount), owing to the outstanding performance thereof. However, almost all torque rods use only vibration attenuation using the elastic deformation of the front rubber 5 and the rear rubber 7 due to a limitation on the size thereof (since the torque rod has difficulty in being mounted to the sub-frame when the size thereof is increased).

That is, to apply vibration attenuation using the flow of liquid, as in the hydraulic engine mount, to the torque rod, although there are required at least two liquid chambers and an insulator for changing the volume of a flow-path liquid chamber that communicates the liquid chambers with each other, there is not sufficient space to mount these elements. In addition, the structure of the torque rod is poor in durability since a large load is repeatedly applied to the torque rod, as in the case of sudden acceleration, which presents itself as a very difficult design problem.

The information disclosed in this Background of the Invention section is only for enhancement of understanding of the general background of the invention and may not be taken as an acknowledgement or any form of suggestion that this the present information forms the prior art already known to a person skilled in the art.

BRIEF SUMMARY

Various aspects of the present invention are directed to providing a torque rod having an attenuation device, which provides additional attenuation via the flow of liquid, is additionally installable even to a conventional torque rod, and is easily replaceable when damaged.

Technical objects to be achieved by the present invention are not limited to those mentioned above, and other objects may be clearly understood by those skilled in the art from the description given below.

In accordance with various aspects of the present invention, the above and other objects can be accomplished by the provision of a torque rod, in which a front rubber and a rear rubber are respectively disposed at front and rear sides of a partition of a case fixed to a sub-frame and in which a pipe portion of a rod connected at a front end portion thereof to a power train passes through the front rubber, the partition, and the rear rubber and is coupled to an end plate, the torque rod including an attenuation device configured to cause flow of a liquid therein according to a load or vibration transferred from the rod, wherein the attenuation device is separably mounted between the rod and the end plate.

The attenuation device may include a base plate having a first liquid chamber recess formed in one surface thereof and a flow path hole perforated in the first liquid chamber recess, an insulator formed of an elastically deformable material and attached to a remaining surface of the base plate, the insulator having a second liquid chamber hole formed at a position at which the second liquid chamber hole communicates with the flow path hole, a pressure plate attached to the insulator to form a second liquid chamber by closing the second liquid chamber hole, and a diaphragm attached to the base plate to form a first liquid chamber by closing the first liquid chamber recess, and the first liquid chamber and the second liquid chamber may be filled with a predetermined amount of liquid, and the liquid may flow between the first liquid chamber and the second liquid chamber through the flow path hole according to elastic deformation of the insulator.

The first liquid chamber and the second liquid chamber may form a pair, and a pair may be provided on either side of the attenuation device.

At least one of the first liquid chamber and the second liquid chamber may be provided with a tunnel portion having a tubular shape so that the flow path hole extends along the tunnel portion to increase a flow distance of the liquid when the liquid flows between the first liquid chamber and the second liquid chamber.

The diaphragm may be formed of a material that elastically deforms upon flow of the liquid, and the diaphragm may be provided with a pressed portion that is recessed to be close to the partition of the case.

The attenuation device may be disposed between the rod and the front rubber, between the partition and the front rubber, between the partition and the rear rubber, and/or between the rear rubber and the end plate. In an exemplary embodiment of the present invention, the attenuation device may have a hole configured to enable insertion of the pipe portion therethrough and may be disposed between the partition and the rear rubber.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

To clearly explain an exemplary embodiment of the present invention, illustration of elements having no connection with the description is omitted, and the same or extremely similar elements are designated by the same reference numerals throughout the specification.

In addition, the terms or words used in the specification and claims of the present invention are not interpreted using typical or dictionary limited meanings, and are constructed as meanings and concepts conforming to the technical sprit of the present invention based on the principle that the inventors can appropriately define the concepts of the terms to explain an exemplary embodiment of the present invention in the best manner.

Various aspects of the present invention are directed to providing a torque rod in which the front rubber 5 and the rear rubber 7 are respectively disposed at the front and rear sides of the partition 6a of the case 6, which is fixed to the sub-frame, and the pipe portion 3a of the rod 3, which is connected at the front end portion thereof to the power train, passes through the front rubber 5, the partition 6a, and the rear rubber 7 and is coupled to the end plate 8. Hereinafter, an exemplary embodiment of the present invention will be described in more detail with reference to the accompanying drawings.

Figure 2:
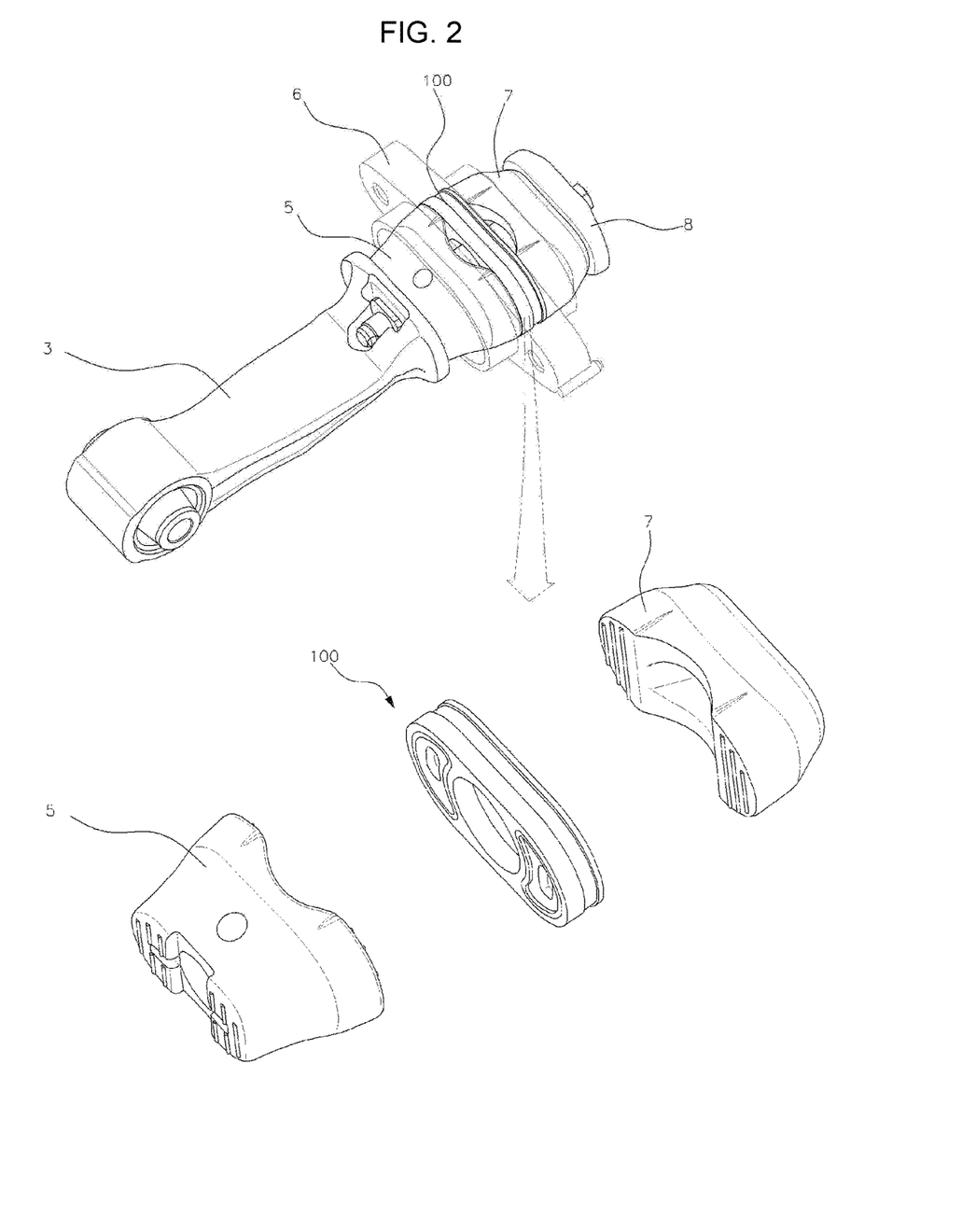
FIG. 2 is a view illustrating a torque rod according to an exemplary embodiment of the present invention.
Figure 3:
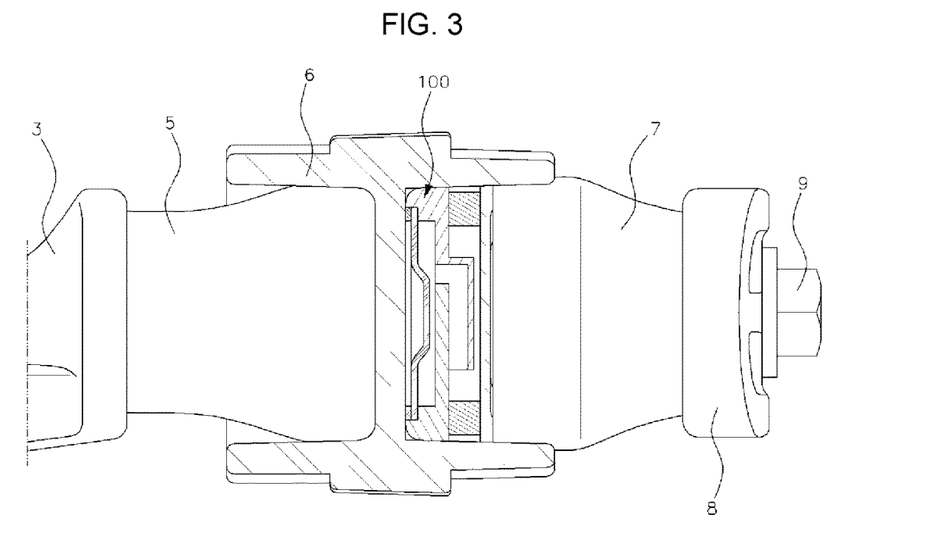
FIG. 3 is a view illustrating the partially cut away state of the torque rod of FIG. 2 to reveal the portion in which an attenuation device is mounted.
Figure 4:
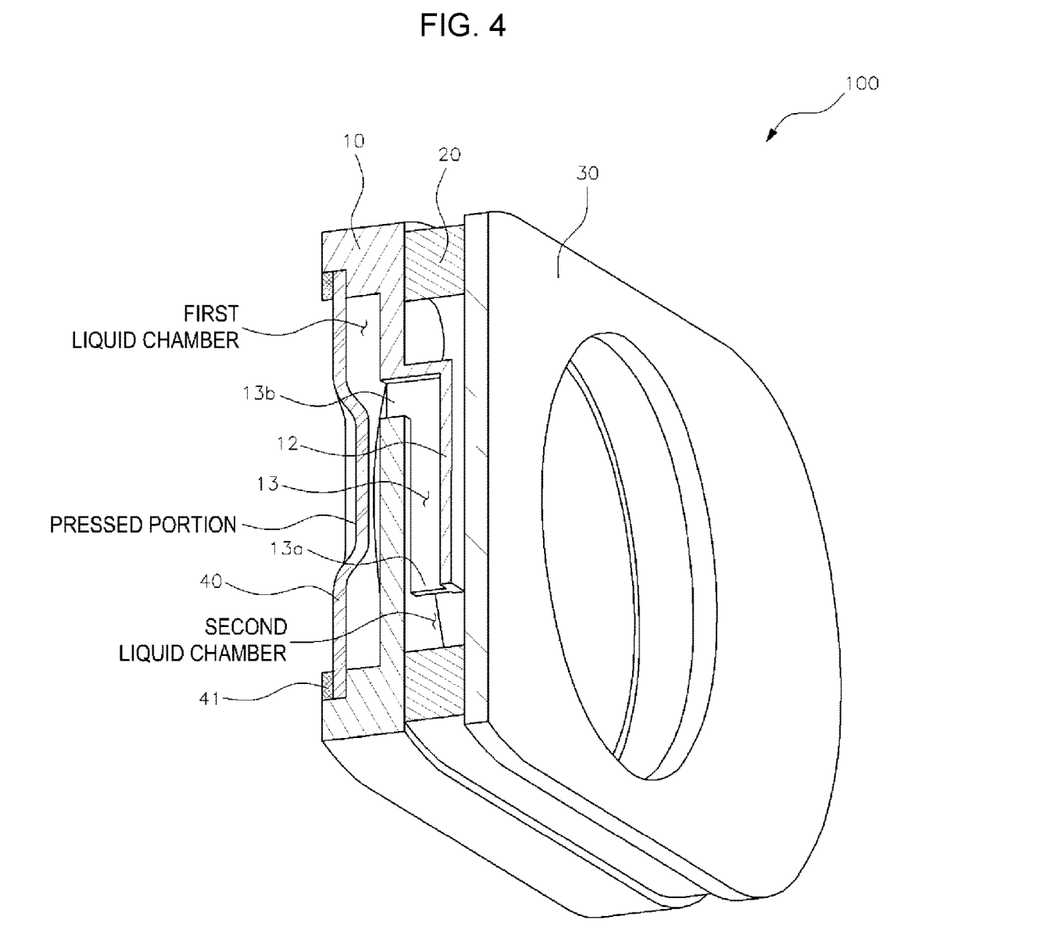
FIG. 4 is a view illustrating the partially cut away state of the attenuation device.

The torque rod according to an exemplary embodiment of the present invention is configured, similar to the conventional configuration previously described above, such that the expanded pipe portion 3a at the rear side of the rod 3 is coupled to the front rubber 5, the case 6, the rear rubber 7, and the end plate 8, but is additionally provided with an attenuation device as illustrated in FIG. 2, FIG. 3 and FIG. 4.

The attenuation device 100 is configured such that the flow of liquid filled therein occurs in response to a load or vibrations transferred from the rod 3, and is separably mounted between the rod 3 and the end plate 8, preferably, between the partition 6a of the case 6 and the rear rubber 7.

The attenuation device 100 according to an exemplary embodiment of the present invention is constructed by coupling a base plate 10, an insulator 20, and a pressure plate 30, which respectively have holes 11, 21 and 31 perforated therein, through which the pipe portion 3a may be fitted, and two diaphragms 40 with one another. With the elastic deformation of the insulator 20, the volume of internal liquid chambers is changed, causing the flow of the filled liquid.

Figure 5:
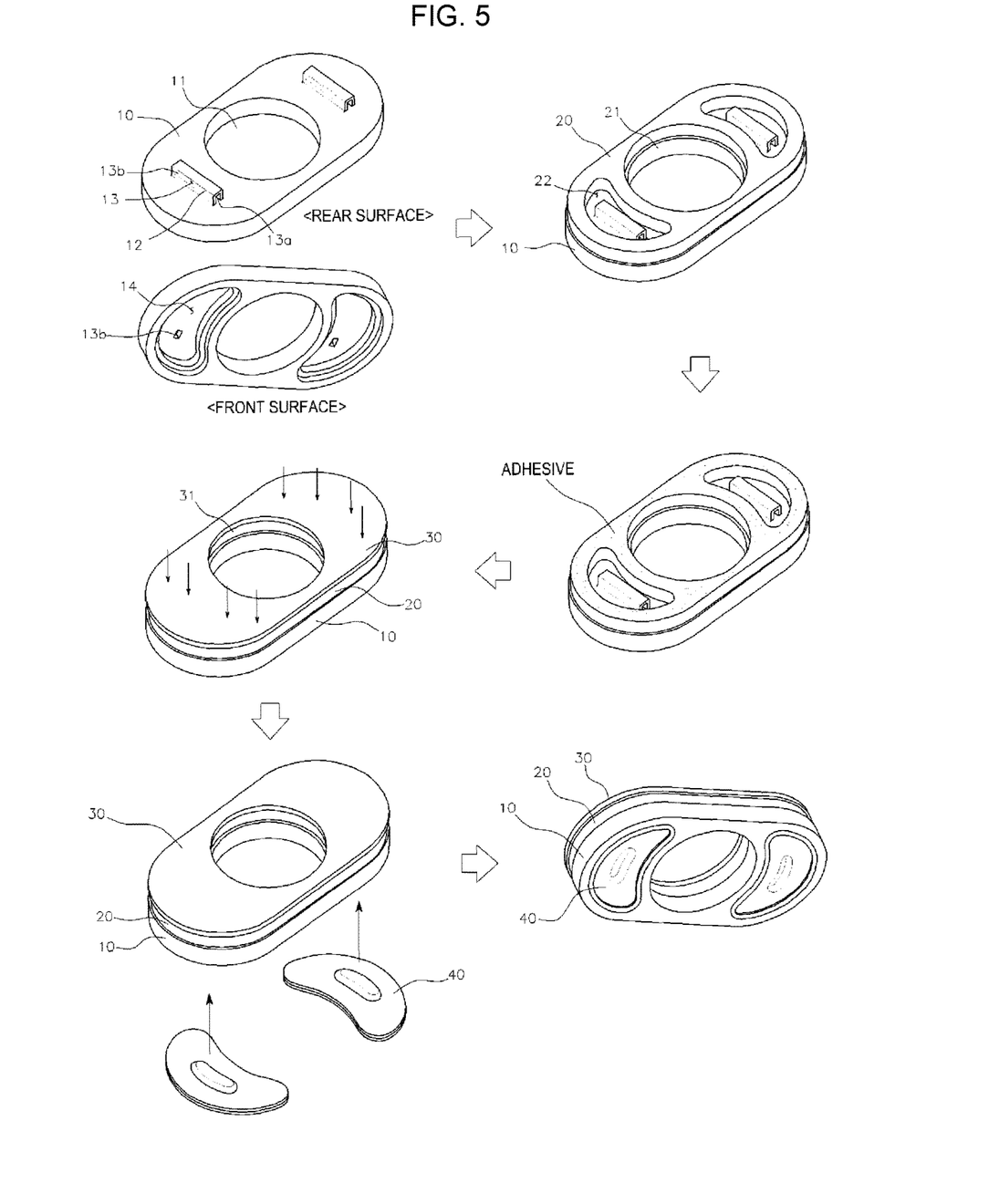
FIG. 5 is a view illustrating the sequence of assembly of the attenuation device.

As illustrated in FIG. 4 and FIG. 5, the base plate 10 may be sized to be fitted between the case 6 and the rear rubber 7 and may have a hole 11 formed in the center thereof to allow the pipe portion 3a to pass therethrough. In addition, first liquid chamber recesses 14 are formed in one surface (the front surface in FIG. 5) of the base plate 10, and flow path holes 13 are perforated in the respective first liquid chamber recesses 14. Each flow path hole 13 is formed in a tunnel portion 12 having a tubular shape to increase the flow distance of liquid when the liquid flows between first liquid chambers and second liquid chambers, and opposite end portions 13a and 13b of the flow path hole 13 are formed in opposite end portions of the tunnel portion 12.

The insulator 20 may be fabricated of, for example, an elastically deformable rubber material or synthetic resin material. The insulator 20 may be integrally or monolithically formed with the other surface (the rear surface in FIG. 5) of the base plate 10 via, for example, rubber curing molding, or may be separately fabricated and then attached to the base plate 10 via, for example, an adhesive. The insulator 20 has second liquid chamber holes 22 formed in opposite sides thereof at positions at which the second liquid chamber holes 22 communicate with the respective flow path holes 13, and the hole 21 through which the pipe portion 3a passes is formed in the center of the insulator 20.

In addition, the pressure plate 30 is attached to the insulator 20 to form the second liquid chambers by closing the second liquid chamber holes 22, and the diaphragms 40 are attached to the base plate 10 to form the first liquid chambers by closing the first liquid chamber recesses 14. In the exemplary embodiment of the present invention, the pressure plate 30 is attached when a predetermined pressure is applied thereto in the state in which an adhesive is applied to the insulator 20. Each diaphragm 40 is mounted in the corresponding first liquid chamber recess 14 in an elastically compressed state (in an interference-fit state), and a seal 41 is additionally mounted to block a gap.

Meanwhile, at the present time, the diaphragm 40 is coupled after the first liquid chamber recesses 14 and the second liquid chambers are filled with a predetermined amount of liquid. That is, after the pressure plate 30 is coupled and before the diaphragm 40 is coupled, the resulting structure is accommodated in a container in which the liquid is stored. As such, the coupling of the diaphragm 40 is performed in the state in which the first liquid chamber recesses 14 and the second liquid chambers are filled with a predetermined amount of liquid.

In the attenuation device 100 configured as described above, when an external load is applied, elastic deformation of the insulator 20 occurs, whereby the volume of the second liquid chambers is changed, causing the liquid to flow through the flow path holes 13.

In addition, to enable an increase in variation in the overall volume by causing the volume of the first liquid chambers to be changed when the volume of the second liquid chambers is changed, the diaphragms 40 are formed of a material that is elastically deformable during the flow of the liquid, and each diaphragm 40 is provided with a pressed portion, which is recessed to be close to the partition 6a of the case 6.

Although the attenuation device 100 is illustrated herein as being disposed between the partition 6a of the case 6 and the rear rubber 7, it may be disposed at any one place between the rod 3 and the front rubber 5, between the partition 6a and the front rubber 5, or between the rear rubber 7 and the end plate 8. In addition, two or more attenuation devices may be stacked or distanced from each other to be disposed at different positions.

The torque rod of the present invention having the configuration described above may acquire not only attenuation caused by the material deformation of the front rubber 5 and the rear rubber 7, but also attenuation caused by the flow of liquid since the attenuation device 100 is additionally mounted therein.

Figure 6:
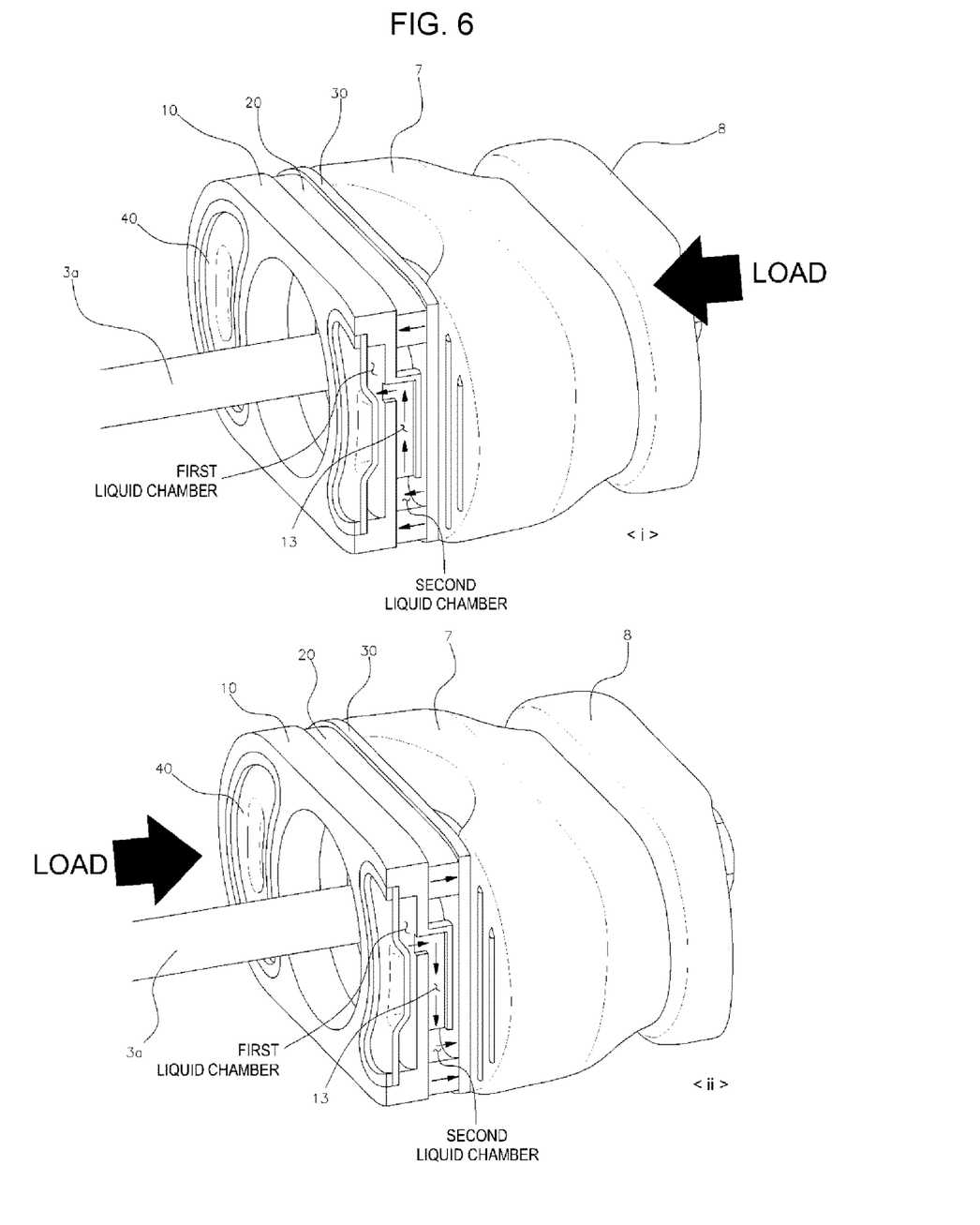
FIG. 6 is a view illustrating <i> the movement path of liquid when a load is applied from the rear side to the front side and <ii> the movement path of liquid when a load is applied from the front side to the rear side.

That is, as illustrated in FIG. 6, when a load is applied from the rear side to the front side (see <i>) or when a load is applied from the front side to the rear side (see <ii>) due to a quick start, rapid acceleration, or sudden stop, the load is also applied to the insulator 20 of the attenuation device 100, causing the flow of liquid simultaneously with the elastic compression of the front rubber 5 or the rear rubber 7. Accordingly, in an exemplary embodiment of the present invention, it is possible to acquire additional attenuation caused by the flow of liquid, in addition to attenuation caused by the elastic deformation of the rubber.

In the torque rod of the present invention having the configuration described above, the attenuation device 100 is separably mounted between the rod 3 and the end plate 8, and thus is easily replaceable when it breaks and is additionally installable even to a conventional torque rod.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A torque rod, in which a front rubber and a rear rubber are respectively disposed at front and rear sides of a partition of a case fixed to a sub-frame and in which a pipe portion of a rod connected at a front end portion thereof to a power train passes through the front rubber, the partition, and the rear rubber and is coupled to an end plate, the torque rod comprising:
   an attenuation device configured to cause flow of a liquid therein according to a load or vibration transferred from the rod,
   wherein the attenuation device is separably mounted between the rod and the end plate,
   wherein the attenuation device includes a tunnel portion and the liquid flows through the tunnel portion having a tubular shape, and
   wherein a size of an internal volume of the tunnel portion is not changed while the liquid flows through the tunnel portion according to the load or the vibration transferred from the rod.

2. The torque rod, according to claim 1, wherein the attenuation device includes:
   a base plate having a first liquid chamber recess formed in one surface thereof and a flow path hole perforated in the first liquid chamber recess;
   a diaphragm attached to the base plate to form a first liquid chamber by closing the first liquid chamber recess;
   an insulator formed of an elastically deformable material and attached to a remaining surface of the base plate, the insulator having a second liquid chamber hole formed at a position at which the second liquid chamber hole communicates with the flow path hole; and
   a pressure plate attached to the insulator to form a second liquid chamber by closing the second liquid chamber hole, wherein the first liquid chamber and the second liquid chamber are filled with a predetermined amount of liquid, and the liquid flows between the first liquid chamber and the second liquid chamber through the flow path hole according to elastic deformation of the insulator.

3. The torque rod, according to claim 2, wherein the first liquid chamber and the second liquid chamber form a pair, and the pair is provided on either side of the attenuation device.

4. The torque rod, according to claim 2, wherein at least one of the first liquid chamber and the second liquid chamber is provided with the tunnel portion having the tubular shape so that the flow path hole extends along the tunnel portion to increase a flow distance of the liquid when the liquid flows between the first liquid chamber and the second liquid chamber.

5. The torque rod, according to claim 2, wherein the diaphragm is formed of a material that elastically deforms upon flow of the liquid.

6. The torque rod, according to claim 5, wherein the diaphragm is provided with a pressed portion that is recessed to be adjacent to the partition of the case.

7. The torque rod, according to claim 2, wherein the attenuation device is disposed between the rod and the front rubber, between the partition and the front rubber, between the partition and the rear rubber, or between the rear rubber and the end plate.

8. The torque rod, according to claim 7, wherein the attenuation device has a hole configured for insertion of the pipe portion therethrough and is disposed between the partition and the rear rubber.

* * * * *